United States Patent
Amin

(10) Patent No.: US 7,493,779 B2
(45) Date of Patent: Feb. 24, 2009

(54) METHOD OF REMOVING SOLID CARBON DIOXIDE

(75) Inventor: Robert Amin, Bentley (AU)

(73) Assignee: Shell Oil Company, Houston, TX (US)

( * ) Notice: Subject to any disclaimer, the term of this patent is extended or adjusted under 35 U.S.C. 154(b) by 471 days.

(21) Appl. No.: 10/525,476

(22) PCT Filed: Aug. 27, 2003

(86) PCT No.: PCT/EP03/09575

§ 371 (c)(1), (2), (4) Date: Aug. 26, 2005

(87) PCT Pub. No.: WO2004/020118

PCT Pub. Date: Mar. 11, 2004

(65) Prior Publication Data
US 2006/0144079 A1 Jul. 6, 2006

(30) Foreign Application Priority Data
Aug. 27, 2002 (AU) .............................. 2002951005

(51) Int. Cl.
F25J 3/00 (2006.01)
C02F 1/22 (2006.01)
(52) U.S. Cl. .................. 62/617; 62/928; 62/532
(58) Field of Classification Search ........... 62/617, 62/532, 928, 929
See application file for complete search history.

(56) References Cited

U.S. PATENT DOCUMENTS

| 3,282,059 | A | | 11/1966 | Maher et al. ................. 62/12 |
|---|---|---|---|---|
| 3,355,902 | A | | 12/1967 | Crawford et al. ............... 62/28 |
| 4,246,015 | A | * | 1/1981 | Styring, Jr. .................... 62/629 |
| 4,351,655 | A | | 9/1982 | Styring, Jr. ..................... 62/28 |
| 4,370,556 | A | * | 1/1983 | Stengl et al. ............. 250/503.1 |
| 4,533,372 | A | * | 8/1985 | Valencia et al. ............... 62/629 |
| 4,793,841 | A | | 12/1988 | Burr ............................. 62/27 |
| 4,861,360 | A | * | 8/1989 | Apffel .......................... 62/625 |
| 5,061,465 | A | * | 10/1991 | Carter ........................ 423/229 |
| 5,062,270 | A | * | 11/1991 | Haut et al. .................... 62/629 |
| 5,819,555 | A | * | 10/1998 | Engdahl ....................... 62/637 |
| 5,956,971 | A | * | 9/1999 | Cole et al. .................... 62/623 |
| 6,224,774 | B1 | | 5/2001 | DeSimone et al. .......... 210/634 |
| 6,886,362 | B2 | * | 5/2005 | Wilding et al. ................ 62/613 |

OTHER PUBLICATIONS

International Search Report dated Feb. 3, 2004.

* cited by examiner

Primary Examiner—William C Doerrler

(57) ABSTRACT

The invention provides a method of removing solid carbon dioxide from cryogenic equipment, including the steps of: (a) introducing a stream including ethane to the cryogenic equipment to convert solid carbon dioxide to liquid form whereby a mixture of liquid ethane and liquid carbon dioxide is formed; and (b) removing the mixture of liquid ethane and liquid carbon dioxide from the cryogenic equipment. In particular, the method can be used in a liquefied natural gas (LNG) plant wherein cryogenic equipment contains LNG, and the method includes the steps of: (a') removing the LNG from the cryogenic equipment; (a) introducing a stream including ethane to convert solid carbon dioxide to liquid form whereby a mixture of liquid ethane and liquid carbon dioxide is formed; and (b) removing the mixture of liquid ethane and liquid carbon dioxide from the cryogenic equipment. The result is an effective cleaning method for fouled LNG equipment.

26 Claims, No Drawings

METHOD OF REMOVING SOLID CARBON DIOXIDE

The present application is a 35 U.S.C. 371 national stage filing of PCT/EP2003/009575 filed Aug. 27, 2003 claiming priority from Australian patent application 2002951005 filed Aug. 27, 2002, hereby incorporated by reference.

FIELD OF THE INVENTION

The present invention relates to a method of removing solid carbon dioxide ($CO_2$) from cryogenic equipment, in particular from cryogenic equipment used in gas conditioning or gas deep-extraction processes, and more particularly from cryogenic equipment used in the production of Liquefied Natural Gas (LNG).

BACKGROUND OF THE INVENTION

Natural gas contains a wide range of species which are capable of forming solids during the cryogenic process of producing LNG known as liquefaction. One of the species that causes considerable problems to LNG producers is carbon dioxide. In a conventional LNG facility, pretreatment of the natural gas is conducted to decrease the carbon dioxide content to between 50 and 125 ppm prior to the natural gas entering the liquefaction process.

On average, carbon dioxide compositions in a natural gas feed stream can range between 0.5% and 30% mol and can be as high as 70% mol in commercially viable reservoirs like Natuna, Indonesia. Carbon dioxide is typically removed using chemical reactions such as reversible absorption processes with amine solvents. These are expensive and complex processes and commonly encounter operational problems such as foaming, corrosion, blocked filters and amine degradation. Losses of amine, water and hydrocarbons are commonly encountered. These processes also consume significant amounts of energy to regenerate and pump the solvent.

LNG refrigeration systems are expensive because so much refrigeration is needed to liquefy natural gas. A typical natural gas stream enters a LNG plant at pressures from about 40 bar to about 76 bar and temperatures from about 20° C. to about 40° C. Natural gas, which is predominantly methane, cannot be liquefied by simply increasing the pressure, as is the case with heavier hydrocarbons used for energy purposes. The critical temperature of methane is −82.5° C. This means that methane can only be liquefied below that temperature regardless of the pressure applied. Since natural gas is a mixture of gases, it liquefies over a range of temperatures. The critical temperature of natural gas is typically between about −85° C. and −62° C. Natural gas compositions at atmospheric pressure will typically liquefy in the temperature range between about −165° C. and −155° C. Since refrigeration equipment represents such a significant part of the LNG facility cost, cleaning of this equipment is important.

In conventional LNG plants, the natural gas is typically cooled in one or more heat exchangers. If insufficient carbon dioxide is removed prior to the natural gas entering the heat exchangers, carbon dioxide precipitates as a solid and accumulates on the cold surfaces of the heat exchangers and other plant equipment eventually rendering these items inoperable. When fouling has reached a critical level, the vessel must be taken off-line for the carbon dioxide solids to be removed. This can be achieved by warming-up the affected equipment. However, this causes considerable downtime and energy-loss for the plant. Alternatively, the solid carbon dioxide may be removed mechanically. In such a case of mechanical defouling of equipment, the vessel, baffles and/or pipework may be damaged, which only encourages further fouling in the next production cycle. Moreover, solids condensing on metal surfaces form an insulating film reducing the thermal efficiency of the heat exchanger.

There is a need for a simpler, more economical process for the removal of solid carbon dioxide that has fouled plant equipment under cryogenic conditions.

SUMMARY OF THE INVENTION

According to one aspect of the present invention, there is provided a method of removing solid carbon dioxide from cryogenic equipment, the method comprising the steps of:
(a) introducing a stream including ethane to said cryogenic equipment to convert solid carbon dioxide to liquid form whereby a mixture of liquid ethane and liquid carbon dioxide is formed; and
(b) removing the mixture of liquid ethane and carbon dioxide from the cryogenic equipment.

According to another aspect of the present invention, there is provided a method of removing carbon dioxide fouling of cryogenic equipment containing LNG, the method comprising the steps of:
(a') removing the LNG from the said cryogenic equipment;
(a) introducing a stream including ethane to convert solid carbon dioxide to liquid form whereby a mixture of liquid ethane and liquid carbon dioxide is formed; and
(b) removing the mixture of liquid ethane and liquid carbon dioxide from the cryogenic equipment whereby the cryogenic equipment is defouled of solid carbon-dioxide and available for the reintroduction of the LNG stream.

DETAILED DESCRIPTION OF THE INVENTION

Preferably the method comprises the step of adjusting the relative percentages of ethane and carbon dioxide for a given pressure and temperature such that the mixture of liquid ethane and carbon dioxide is near azeotropic. By near azeotropic is understood a composition wherein the carbon dioxide content varies between 5% mol below or above the azeotropic composition. It is known that ethane and carbon dioxide form an azeotrope. An azeotrope forms because of a particular molecular interaction between two or more components. When such components are mixed, the vapour and liquid compositions at equilibrium are equal within a given pressure and temperature range. The formation of an azeotrope is usually seen to introduce an obstacle for the separation of the two components within the liquid mixture and is thus something that is typically avoided in chemical processing plants. The azeotropic composition is dependent on the temperature and pressure, but is generally about 65% mol carbon dioxide and 35% mol ethane.

Although the stream including ethane may be gaseous, the stream including ethane is preferably liquid. This stream may contain pure or substantially pure ethane. It may also comprise other components. Preferably the stream including ethane contains at least 35% mol ethane. Suitable components include other hydrocarbons, such as propane and butane, and carbon dioxide. It is preferred that the stream including ethane contains some carbon dioxide already. The fastest and most efficient dissolution of carbon dioxide solids occur under these conditions. The content of carbon dioxide may suitably vary from 0 to about 65% mol.

Preferably, the method further comprises the step of separating the mixture of liquid ethane and carbon dioxide to form a first product rich in ethane and a second product rich in carbon dioxide. More preferably, the first product rich in ethane is available for recycling to step (a). More preferably, the second product rich in carbon dioxide is also recovered and recycled. When the carbon dioxide content is somewhat lower than the azeotropic composition the separation between an ethane-rich product and a carbon dioxide-rich product can easily be achieved by distillation. The ethane-rich product may then be substantially pure ethane, whereas the carbon dioxide-rich product has the azeotropic composition.

When the mixture of liquid ethane and carbon dioxide has an azeotropic composition, the method of separating the azeotropic mixture may include distillation or membrane-based separation techniques or a combination thereof. The method may include the step of introducing one or more alkanes to the azeotropic mixture prior to the separation step. The addition of one or more alkanes has the effect of widening the two-phase liquid vapour equilibrium area in the ethane-carbon dioxide system to allow easier separation of ethane and carbon dioxide from the azeotropic ethane-carbon dioxide liquid mixture.

Preferably, the cryogenic equipment is selected from the list including heat exchangers, pipes, storage vessels, sub-cooling vessels and/or separators.

The present invention will now be described in more detail by means of the following example.

The present invention derives from observations made during a series of tests conducted using a cryogenic vessel known as the Sapphire Cell. The Sapphire Cell as the name suggests is constructed of pure single crystal sapphire and allows hitherto impossible direct observation of the phenomena occurring during LNG liquefaction. Based on their observations of these phenomena, the applicant has realised that liquid ethane can be used to remove carbon dioxide fouling of cryogenic equipment.

During testing, the Sapphire Cell was used as a flash vessel in fluid communication with a cryogenic chamber. Natural gas was introduced to the Sapphire Cell and flashed down to 40 bar at −82° C. whereby LNG was formed. Under the conditions at which liquefaction takes place, the carbon dioxide still present in the natural gas feed stream will precipitate out in solid form within the flash vessel.

The LNG produced was stored in the cryogenic chamber and the system was cooled down to −80° C using a multi-component refrigerant system and with liquid nitrogen down to −161° C. The cryogenic chamber was maintained at the same pressure as the flash vessel until equilibrium conditions were attained so that the vapour-liquid equilibrium phase diagrams for a given range of compositions could be generated.

The liquid level within each of the flash vessel and cryogenic chamber was measured using simple volumetric calibration. The liquid level within the Sapphire Cell could also be observed by the eye through the transparent walls of the Cell.

The temperature of the system was monitored using temperature sensors inside each of the chambers with a third temperature sensor monitoring the air bath around the cryogenic chamber and flash vessel. Pressure sensors were located outside the air bath at the inlet and outlet of each of the cryogenic chamber and the flash vessel. Multi-port sampling valves were provided for each of the cryogenic chamber and flash vessel to allow on-line gas chromatographic analysis of samples when desired.

The system was agitated using a vortex operated magnetically until solid separation of the carbon dioxide was observed. The vortex encouraged gravity separation of the more dense carbon dioxide solids to the bottom of the chamber. The effect of creating a vortex is to draw the solids formed within the vessel towards the wall of the vessel where they migrate down towards the bottom of the vessel. The vortex can be established by mechanical means using a stirrer or by including a hydrocyclone at the base of the vessel.

In the first series of tests natural gas of known composition as outlined below in Table 1 was introduced through a control valve into the Sapphire Cell.

TABLE 1

GC Analysis of the Feed Gas*

| | Component | Mole Fraction |
|---|---|---|
| 1 | $N_2$ | 2.54 |
| 2 | $CO_2$ | 2.39 |
| 3 | $C_1$ | 84.16 |
| 4 | $C_2$ | 7.08 |
| 5 | $C_3$ | 3.05 |
| 6 | $iC_4$ | 0.31 |
| 7 | $nC_4$ | 0.38 |
| 8 | $iC_5$ | 0.05 |
| 9 | $nC_{5+}$ | 0.04 |

*(Gas includes ppm's of mercaptan)

In a second series of tests, additional carbon dioxide was added to the chamber to bring the carbon dioxide content up to 25% as outlined below in Table 2.

TABLE 2

GC Analysis of the Feed Gas with Addition of Extra $CO_2$*

| | Component | Mole Fraction |
|---|---|---|
| 1 | $N_2$ | 1.939 |
| 2 | $CO_2$ | 24.95 |
| 3 | $C_1$ | 64.64 |
| 4 | $C_2$ | 5.493 |
| 5 | $C_3$ | 2.385 |
| 6 | $iC_4$ | 0.239 |
| 7 | $nC_4$ | 0.292 |
| 8 | $iC_5$ | 0.038 |
| 9 | $nC_{5+}$ | 0.023 |

*(Gas includes ppm's of mercaptan)

LNG was transferred into the cryogenic storage vessel leaving behind a slush comprising a relatively small percentage of LNG plus solid carbon dioxide crystals in the flash vessel. The composition of the LNG produced during the liquefaction process is outlined below in Table 3. From this table it can be seen that the carbon dioxide composition has been reduced from 25% in Table 2 to just 0.29% due to the freeze out of carbon dioxide solids.

TABLE 3

GC Analysis of the Produced LNG After $CO_2$ Separation at 10 bar −140° C.

| | Component | Mole Fraction |
|---|---|---|
| 1 | $N_2$ | 1.28 |
| 2 | $CO_2$ | 0.29 |
| 3 | $C_1$ | 94.65 |
| 4 | $C_2$ | 4.48 |
| 5 | $C_3$ | 2.02 |
| 6 | $iC_4$ | 0.21 |
| 7 | $nNC_4$ | 0.27 |
| 8 | $iC_5$ | 0.04 |
| 9 | $nC_{5+}$ | 0.03 |

Carbon dioxide content was increased to 30% in the original gas composition shown in Table 1.

The flash vessel containing the slush was left for one hour to achieve equilibrium. Liquid ethane was introduced at the same conditions of −80° C. and 26 bar. It was observed that the solid carbon dioxide within the slush started to dissolve immediately as liquid ethane was introduced.

In a third series of tests, a liquid mixture of 15% mol carbon dioxide and 85% mol ethane was introduced into the Sapphire Cell. The contents of the Sapphire Cell were agitated using the magnetically induced vortex. The transparent walls of the Sapphire Cell made it possible to observe the fine solid crystals of carbon dioxide forming and dissolving in rapid succession.

In the first preferred embodiment of the present invention, a heat exchanger or other cryogenic pipework fouled with carbon dioxide is taken off-line. Liquid ethane is then introduced into the heat exchanger or pipework. The carbon dioxide solids dissolve as they convert back to liquid form. Dissolution of carbon dioxide occurs at any composition of the stream including ethane. The fastest rate of dissolution has been observed to occur when the stream includes ethane and carbon dioxide, and in particular when the ethane and carbon dioxide are present in such stream in sufficient relative amounts at a given pressure and temperature to form an azeotropic mixture. Under azeotropic conditions, dissolution of the carbon dioxide solids is observed to happen at its greatest speed and with greatest efficiency.

Having introduced the ethane and converted the solid carbon dioxide to liquid form, it is preferable for the mixture of ethane and carbon dioxide to be separated to recover and recycle the ethane.

The most common method of separating homogeneous liquid mixtures is the use of distillation, i.e. repeated vaporisation and condensation whereby the vapour phase gradually becomes enriched in the more volatile component. However, separation of a liquid mixture by distillation depends on the fact that even when a liquid is partially vaporised, the vapour and liquid compositions differ. The vapour phase becomes progressively more enriched in the more volatile component and is depleted in the less volatile component. Repeated partial vaporisation is used to achieve the desired degree of separation. An azeotrope, however, cannot be separated using ordinary distillation since little enrichment of the vapour phase occurs with each partial vaporisation step.

Therefore in most cases, azeotropic liquid mixtures require special methods to facilitate separation of the component species.

Separation of the azeotropic mixture may be effected using techniques such as extraction, absorption, crystallisation, decanting, multi-stage extraction or other chemical treatments or any combination thereof. In order to use extractive distillation in either a continuous or batch operation, it may be necessary to add an entrainer such as propane, butane or other suitable alkane or a combination thereof, the choice being dependent on the particular phase behaviour of the system and available compounds. It is envisaged that the alkane or alkanes would be recovered and recycled to the system also.

Alternatively, membrane separation methods may be used prior to or independently of distillation. Such methods include dialysis, reverse osmosis, ultra-filtration, electrodialysis, helium separation through glass, hydration separation through palladium and alloy membranes, immobilised solvents and/or liquid-surfactant membranes. The driving force for separation using membranes is either a pressure or concentration difference across the membrane. Membranes may be used to break azeotropic mixtures prior to feeding the mixture to a subsequent continuous or batch distillation separation process.

In the second preferred embodiment of the present invention, the method can be used for removing solid carbon dioxide from cryogenic equipment used in the production of LNG. The LNG would first be drained from the system before introducing liquid ethane in the manner outlined above.

A series of tests conducted using the Sapphire Cell have confirmed that the presence of methane in the natural gas feed stream has little or no effect on the formation of carbon dioxide solids during LNG liquefaction nor the subsequent dissolution of the carbon dioxide solids when the ethane is introduced.

It is proposed that this method of removing carbon dioxide contaminants could be used for pipelines for carrying LNG, heat exchangers, cryogenic cooling vessels, and any other plant equipment used under cryogenic conditions where carbon dioxide fouling occurs.

It will be readily apparent to a person skilled in the relevant art that the present invention has significant advantages over the prior art including, but not limited to, the following:
(a) Existing LNG plants can be defouled without any requirement for modification of the plant equipment;
(b) Recycling of the ethane will significantly contribute to reducing the cost of applying the method according to the present invention for the removal of the carbon dioxide solid contaminants;
(c) The process is applicable to a wide variation of feed gas compositions; and
(d) The carbon dioxide content of the natural gas can be adjusted in order to assist in the removal of the carbon dioxide solids by the ethane.

What is claimed is:

1. A method of removing solid carbon dioxide from cryogenic equipment, comprising the steps of:
   (a) introducing a stream including ethane to said cryogenic equipment to convert solid carbon dioxide to liquid form whereby a mixture of liquid ethane and liquid carbon dioxide is formed; and
   (b) removing the mixture of liquid ethane and liquid carbon dioxide from the cryogenic equipment, further comprising the step of adjusting the relative percentages of ethane and carbon dioxide for a given pressure and temperature such that the mixture of liquid ethane and liquid carbon dioxide is near azeotropic.

2. The method of claim 1, in which the cryogenic equipment is used to produce liquefied natural gas.

3. The method of claim 1, in which the stream including ethane contains carbon dioxide up to 65% mol.

4. The method of claim 1, in which the method further comprises the step of separating the mixture of liquid ethane and liquid carbon dioxide to form a first product enriched in ethane and a second product enriched in carbon dioxide.

5. The method of claim 4, in which the first and second product are separated by distillation, extraction, absorption, crystallisation, decanting, multi-stage extraction or other chemical treatments or any combination thereof.

6. The method of claim 1, in which the mixture of liquid ethane and liquid carbon dioxide is azeotropic, and is separated to form a first product enriched in ethane and a second product enriched in carbon dioxide by extractive distillation or membrane-based separation techniques or a combination thereof.

7. The method of claim 4, in which one or more alkanes or their isotopes are introduced to the mixture prior to the separation step.

8. The method of claim 4, in which the stream that includes ethane comprises the first product that is recycled to the step (a).

9. A method of removing solid carbon dioxide from cryogenic equipment, wherein the cryogenic equipment contains liquefied natural gas, the method comprising the steps of:
(a') removing the liquefied natural gas from the cryogenic equipment;
(a) introducing a stream including ethane to convert solid carbon dioxide to liquid form whereby a mixture of liquid ethane and liquid carbon dioxide is formed; and
(b) removing the mixture of liquid ethane and liquid carbon dioxide from the cryogenic equipment, further comprising the step of adjusting the relative percentages of ethane and carbon dioxide for a given pressure and temperature such that the mixture of liquid ethane and liquid carbon dioxide is near azeotropic.

10. A method of producing liquefied natural gas, wherein natural gas is introduced in cryogenic equipment and is cooled down to form liquefied natural gas, and further wherein solid carbon dioxide is removed from the cryogenic equipment by:
(a) introducing a stream including ethane to the cryogenic equipment to convert solid carbon dioxide to liquid form whereby a mixture of liquid ethane and liquid carbon dioxide is formed; and
(b) removing the mixture of liquid ethane and liquid carbon dioxide from the cryogenic equipment, wherein relative percentages of ethane and carbon dioxide are adjusted for a given pressure and temperature such that the mixture of liquid ethane and liquid carbon dioxide is near azeotropic.

11. The method of claim 10, wherein the stream including ethane contains carbon dioxide up to 65% mol.

12. The method of claim 10, wherein the liquefied natural gas is removed from the cryogenic equipment prior to the step (a).

13. The method of claim 2, in which the stream including ethane contains carbon dioxide up to 65% mol.

14. The method of claim 1, in which the stream including ethane contains carbon dioxide up to 65% mol.

15. The method claim 2, in which the method further comprises the step of separating the mixture of liquid ethane and liquid carbon dioxide to form a first product enriched in ethane and a second product enriched in carbon dioxide.

16. The method claim 1, in which the method further comprises the step of separating the mixture of liquid ethane and liquid carbon dioxide to form a first product enriched in ethane and a second product enriched in carbon dioxide.

17. The method claim 3, in which the method further comprises the step of separating the mixture of liquid ethane and liquid carbon dioxide to form a first product enriched in ethane and a second product enriched in carbon dioxide.

18. A method of removing solid carbon dioxide from cryogenic equipment, comprising the steps of:
(a) introducing a stream including ethane to said cryogenic equipment to convert solid carbon dioxide to liquid form whereby a mixture of liquid ethane and liquid carbon dioxide is formed; and
(b) removing the mixture of liquid ethane and liquid carbon dioxide from the cryogenic equipment, wherein the solid carbon dioxide is already present on a surface of said cryogenic equipment prior to said introducing said stream.

19. The method of claim 18, in which the cryogenic equipment is used to produce liquefied natural gas.

20. The method of claim 18, further comprising the step of adjusting the relative percentages of ethane and carbon dioxide for a given pressure and temperature such that the mixture of liquid ethane and liquid carbon dioxide is near azeotropic.

21. The method of claim 18, in which the stream including ethane contains carbon dioxide up to 65% mol.

22. The method of claim 18, in which the method further comprises the step of separating the mixture of liquid ethane and liquid carbon dioxide to form a first product enriched in ethane and a second product enriched in carbon dioxide.

23. The method of claim 22, in which the first and second product are separated by distillation, extraction, absorption, crystallisation, decanting, multi-stage extraction or other chemical treatments or any combination thereof.

24. The method of claim 18, in which the mixture of liquid ethane and liquid carbon dioxide is azeotropic, and is separated to form a first product enriched in ethane and a second product enriched in carbon dioxide by extractive distillation or membrane-based separation techniques or a combination thereof.

25. The method of claim 22, in which one or more alkanes or their isotropes are introduced to the mixture prior to the separation step.

26. The method of claim 22, in which the stream that includes ethane comprises the first product that is recycled to the step (a).

* * * * *